United States Patent
Dewar

(10) Patent No.: US 7,168,943 B2
(45) Date of Patent: Jan. 30, 2007

(54) GUIDED VALVE PIN FOR AN INJECTION MOLDING APPARATUS

(75) Inventor: Neil Dewar, Georgetown (CA)

(73) Assignee: Mold-Masters Limited, Georgetown (CA)

( * ) Notice: Subject to any disclaimer, the term of this patent is extended or adjusted under 35 U.S.C. 154(b) by 226 days.

(21) Appl. No.: 10/651,547

(22) Filed: Aug. 29, 2003

(65) Prior Publication Data

US 2005/0046082 A1    Mar. 3, 2005

(51) Int. Cl.
*B29C 45/23*  (2006.01)

(52) U.S. Cl. .................. 425/564; 264/328.9; 425/566

(58) Field of Classification Search ............... 425/562, 425/563, 564, 565, 566; 264/328.9
See application file for complete search history.

(56) References Cited

U.S. PATENT DOCUMENTS

| | | |
|---|---|---|
| 2,865,050 A | 12/1958 | Strauss |
| 3,777,990 A | 12/1973 | Herzog |
| 3,806,295 A | 4/1974 | Gellert |
| 3,807,914 A | 4/1974 | Paulson et al. |
| 4,013,393 A | 3/1977 | Gellert |
| 4,026,518 A | 5/1977 | Gellert |
| 4,212,626 A | 7/1980 | Gellert |
| 4,285,661 A | 8/1981 | Yotsuisuji et al. .......... 425/563 |
| 4,521,179 A | 6/1985 | Gellert |
| 4,530,654 A | 7/1985 | Rose |
| 4,781,572 A | 11/1988 | Boring ....................... 425/564 |
| 4,789,318 A | 12/1988 | Ehritt |
| 4,938,681 A | 7/1990 | Gellert |
| 5,125,817 A | 6/1992 | Yamachika |
| 5,238,378 A | 8/1993 | Gellert ....................... 425/130 |
| 5,423,672 A | 6/1995 | Gordon |
| 5,556,582 A | 9/1996 | Kazmer |
| 5,695,793 A | 12/1997 | Bauer |
| 5,851,571 A | 12/1998 | Manner |
| 5,996,618 A | 12/1999 | Saito |
| 6,270,711 B1 | 8/2001 | Gellert et al. |
| 6,287,107 B1 * | 9/2001 | Kazmer et al. ............. 425/562 |

(Continued)

FOREIGN PATENT DOCUMENTS

DE        43 11 196 A1    10/1994

(Continued)

*Primary Examiner*—Tim Heitbrink
(74) *Attorney, Agent, or Firm*—Medler Ferro PLLC

(57) ABSTRACT

An injection molding apparatus comprises a manifold having a manifold channel for receiving a melt stream of moldable material under pressure and delivering the melt stream to a nozzle channel of a nozzle. A mold cavity is in communication with the nozzle channel of the nozzle and receives melt through a mold gate. A valve pin is axially movable through the nozzle channel of the nozzle to selectively open the mold gate. The mold gate is open when the valve pin is in an extended position and a portion of the valve pin is received in the mold cavity. At least one groove is provided in an outer surface of the valve pin and at least a portion of the outer surface of the valve pin is in continuous engagement with the mold gate to align the valve pin relative to the mold gate. When the valve pin is in the extended position, the groove is aligned with the mold gate to allow melt to flow between the nozzle channel and the mold cavity. When the valve pin is in the retracted position, the valve pin is seated in the mold gate to block melt flow between the nozzle channel and the mold cavity.

24 Claims, 10 Drawing Sheets

U.S. PATENT DOCUMENTS

| | | |
|---|---|---|
| 6,830,447 B2 | 12/2004 | Babin |
| 2002/0028266 A1 | 3/2002 | Babin |
| 2002/0050664 A1 | 5/2002 | Moore, Jr. et al. |
| 2002/0086074 A1 | 7/2002 | Lavallee |
| 2002/0110617 A1 | 8/2002 | Lee |
| 2004/0217449 A1 | 11/2004 | Manigatter et al. |

FOREIGN PATENT DOCUMENTS

| | | |
|---|---|---|
| DE | 196 08 676 C1 | 1/1997 |
| DE | 102 07 065 A1 | 8/2003 |
| EP | 0 011 805 B1 | 2/1984 |
| EP | 0 891 851 A1 | 1/1999 |
| EP | 0 800 907 B1 | 4/2001 |
| JP | 55-61438 | 5/1980 |
| JP | 55061438 | 5/1980 |
| JP | 10024453 A | 7/1996 |

* cited by examiner

GUIDED VALVE PIN FOR AN INJECTION MOLDING APPARATUS

FIELD OF THE INVENTION

The present invention relates generally to an injection molding apparatus and, in particular, to a hot runner nozzle having a guided valve pin.

BACKGROUND OF THE INVENTION

In an injection molding apparatus having a plurality of valve-pin gated hot runner nozzles for injecting melt into a plurality of mold cavities, proper alignment between the moving components is critical in order to maximize the lifetime of the components and produce high quality molded parts.

Typically, prior art valve-gated nozzles include reciprocating valve pins, which retract to open the mold gates and extend to close the mold gates. In this type of arrangement, the valve pin is typically un-guided during the opening and closing phases of the injection cycle. As such, each valve pin must re-align itself every time it engages the mold gate. This can cause both the valve pin and the mold gate to experience wear. Thus necessitating frequent replacement of these parts, which can be costly.

Several prior art valve-gated nozzles include continuously guided valve pins, which reduce wear on the valve pin and mold gate. These prior art nozzles are typically limited to molding articles having a hole, such as a compact disc, for example. U.S. Pat. No. 5,423,672 to Gordon discloses a valve-gated nozzle for molding products having a hole.

A further disadvantage of prior art valve-gated nozzles is that the size of the piston may limit the number of applications for the nozzle. For example, nozzles having large pistons may not be used in an injection molding apparatus requiring a small pitch between the nozzles.

It is therefore an object of the present invention to obviate or mitigate at least one of the above-noted disadvantages.

SUMMARY OF THE INVENTION

According to an embodiment of the present invention there is provided an injection molding apparatus including:

a manifold having a manifold channel for receiving a melt stream of moldable material under pressure and delivering the melt stream to a nozzle channel of a nozzle;

a mold cavity in communication with the nozzle channel of the nozzle for receiving melt through a mold gate;

a valve pin axially movable through the nozzle channel of the nozzle to selectively open the mold gate, the mold gate being open when the valve pin is in an extended position in which a portion of the valve pin is received in the mold cavity;

at least one groove provided in an outer surface of the valve pin, at least a portion of the outer surface of the valve pin being in continuous engagement with the mold gate to align the valve pin relative to the mold gate;

wherein in the extended position the groove is aligned with the mold gate to allow melt to flow between the nozzle channel and the mold cavity and in the retracted position the valve pin is seated in the mold gate to block melt flow between the nozzle channel and the mold cavity.

According to another embodiment of the present invention there is provided a method of injecting a melt stream of moldable material into a mold cavity of an injection molding apparatus including:

delivering a melt stream of moldable material to a manifold channel of a manifold, the melt stream flowing from the manifold channel into a nozzle channel of a nozzle;

moving the valve pin from a retracted position, in which a forward end of the valve pin is seated in a mold gate, to an extended position partially inside a mold cavity to open the mold gate and allow melt to flow from the nozzle channel of the nozzle into the mold cavity;

filling the mold cavity;

moving the valve pin from the extended position to the retracted position to close the mold gate;

wherein melt located in the mold cavity decompresses to fill in a space vacated by the valve pin.

According to another embodiment of the present invention there is provided an injection molding apparatus including:

a manifold having a manifold channel for receiving a melt stream of moldable material under pressure and delivering the melt stream to a nozzle channel of a nozzle;

a mold cavity in communication with the nozzle channel of the nozzle for receiving melt through a mold gate;

a valve pin axially movable through the nozzle channel of the nozzle between a retracted position, in which a forward end of the valve pin is seated in the mold gate to block melt flow between the nozzle channel and the mold cavity, and an extended position, in which a portion of the valve pin is received in the mold cavity;

a material feeding portion provided in a guiding surface of the valve pin, at least a portion of the guiding surface being in continuous engagement with the mold gate to align the valve pin relative to the mold gate;

wherein in the extended position, the material feeding portion is aligned with the mold gate to allow melt to flow between the nozzle channel and the mold cavity.

According to another embodiment of the present invention there is provided an injection molding apparatus including:

a manifold having a manifold channel for receiving a melt stream of moldable material under pressure;

a first nozzle having a first nozzle channel for receiving the melt stream from the manifold channel, the first nozzle channel having a first valve pin axially movable therethrough, the first valve pin for selectively opening a first mold gate;

a second nozzle having a second nozzle channel for receiving the melt stream from the manifold channel; the second nozzle channel having a second valve pin axially movable therethrough, the second valve pin for selectively opening a second mold gate;

a mold cavity in communication with the first nozzle channel and the second nozzle channel for receiving melt through the first mold gate and the second mold gate;

a valve pin axially movable through the nozzle channel of the nozzle to selectively open the mold gate;

at least one groove provided in an outer surface of the first valve pin, at least a portion of the outer surface of the first valve pin being in continuous engagement with the first mold gate to align the valve pin relative to the first mold gate; and wherein the first mold gate is open when the first valve pin is in an extended position in which a portion of the first valve pin is received in the mold cavity and the at least one groove is aligned with the first mold gate.

BRIEF DESCRIPTION OF THE FIGURES

Embodiments of the present invention will now be described more fully with reference to the accompanying drawings in which like reference numerals indicate similar structure.

DETAILED DESCRIPTION OF THE INVENTION

Figure 1:
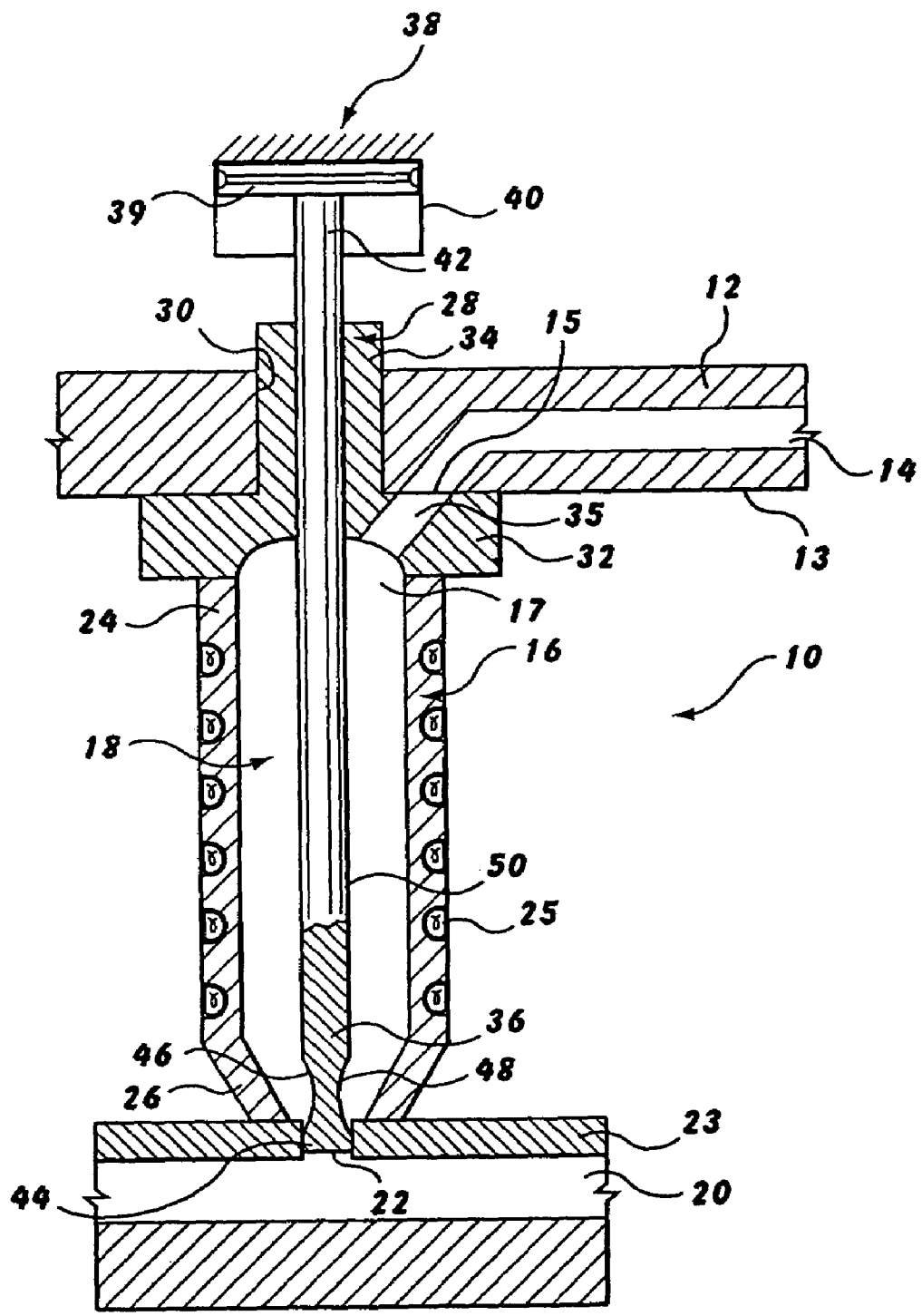
FIG. 1 is a side view partly in section of an injection molding apparatus according to an embodiment of the present invention.

Referring now to FIG. 1, portions of an injection molding apparatus 10 is generally shown. The injection molding apparatus 10 includes a manifold 12 having a manifold channel 14 for receiving a melt stream of moldable material from a machine nozzle (not shown). A plurality of hot runner nozzles 16 having nozzle channels 18 are coupled to the manifold 12 (only one nozzle 16 is shown for simplicity). The nozzle 16 receives the melt stream from the manifold channel 14 and delivers the melt to a mold cavity 20 through a mold gate 22. The mold gate 22 extends through mold plate 23, which partially surrounds the mold cavity 20.

The nozzle 16 includes a first end 24 and a nozzle tip 26. A valve pin bushing 28 is provided between the nozzle 16 and the manifold 12. The valve pin bushing 28 includes a head portion 32, which is sandwiched between the first end 24 of the nozzle 16 and a lower surface 13 of the manifold 12, and a bushing portion 34, which is received in an aperture 30 provided in the manifold 12. The valve pin bushing 28 includes a channel 35 that is aligned with an outlet 15 of the manifold channel 14 and an inlet 17 of the nozzle channel 18.

The nozzle 16 further includes a heater 25. The heater 25 is a heating element embedded in an outer surface of the nozzle, however, it will be appreciated that the nozzle 16 may be heated in any manner known in the art. The manifold 12 is also heated by a heater (not shown). The manifold heater may also be any heater known in the art.

Figure 2:
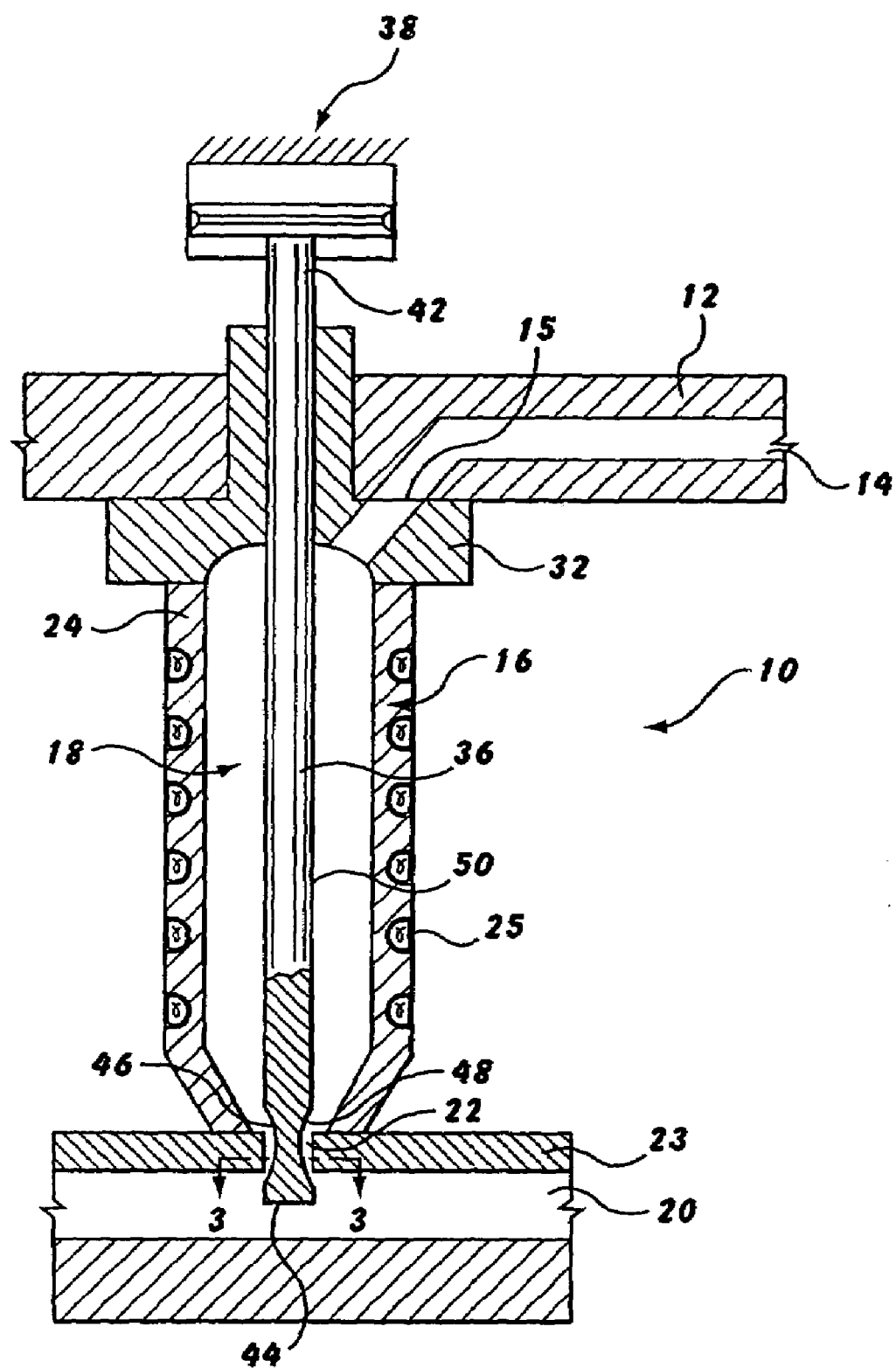
FIG. 2 is a side view partly in section of the injection molding apparatus of FIG. 1 in which a valve pin is in an extended position.

A valve pin 36 extends through the nozzle channel 18 of the nozzle 16 and is slidably received by the valve pin bushing 28. The valve pin 36 is axially movable between a retracted position, which is shown in FIG. 1, and an extended position, which is shown in FIG. 2. In the retracted position, the valve pin 36 is seated in the mold gate 22 to block melt flow between the nozzle channel 18 and the mold cavity 20. In the extended position, the valve pin 36 is located partly in the mold cavity 20 and the nozzle channel 18 is in fluid communication with the mold cavity 20 to allow melt to flow therebetween.

The valve pin 36 is actuated by an actuating device 38. The actuating device 38 includes a piston 39 that is movable within a cylinder 40. Because the valve pin 36 closes the mold gate 22 by retracting, no packing is performed on the melt in the mold cavity 20. As such, the piston 39 may be smaller than a piston used in injection molding apparatus that packs melt because the additional power for extending the valve pin into a full mold cavity is not required. As such, nozzles 16 including valve pins 36 are suitable for use in applications in which a small pitch between nozzles is important.

The actuating device 38 may be pneumatically or hydraulically driven. Alternatively, the valve pin 36 may be actuated by any other suitable means known in the art.

The valve pin 36 includes a first end 42, which is coupled to the piston 39, and a second end 44, which engages the mold gate 22. First and second grooves 46 and 48, respectively, are formed in an outer surface, or guiding surface, 50 of the valve pin 36. The grooves 46, 48 extend along a portion of the valve pin 36 adjacent the second end 44. The grooves 46, 48 form part of the nozzle channel 18 when the valve pin 36 is in the extended position of FIG. 1. Each groove 46, 48 has a generally smooth profile to facilitate the flow of melt into the mold cavity 20. The profile of the grooves 46, 48 is generally identical.

It will be appreciated that the profile of one or both of the grooves 46, 48 may be shaped differently in order to optimize the flow of melt for a particular injection molding application. In addition, the length of the grooves 46, 48 may be varied provided that the second end of the valve pin 36 engages the mold gate 22 to block melt flow between the nozzle channel 18 and the mold cavity 20.

Figure 3:
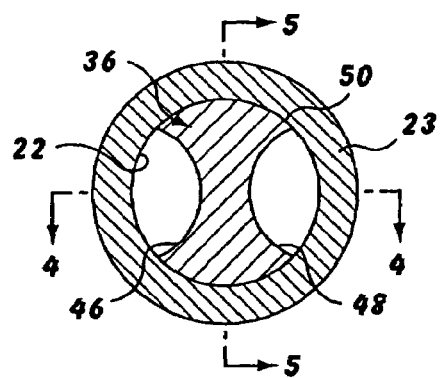
FIG. 3 is a view on 3—3 of FIG. 2.
Figure 4:
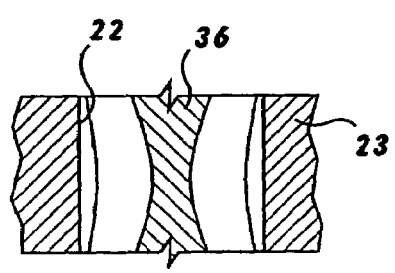
FIG. 4 is a view on 4—4 of FIG. 3.
Figure 5:
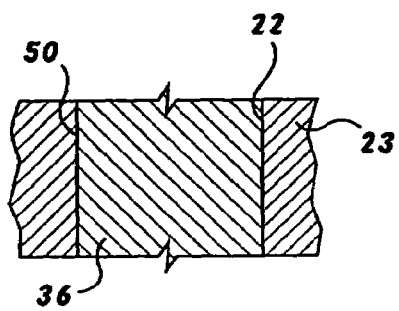
FIG. 5 is a view on 5—5 of FIG. 3.

Referring to FIGS. 3 to 5, a cross-sectional view of the valve pin 36 at the location of the grooves 46, 48 is shown. The grooves 46, 48 are generally crescent shaped to optimize the melt flow past the valve pin 36 without significantly compromising the strength of the valve pin 36.

At least a portion of the outer surface 50 of the valve pin 36 is continuously engaged in the mold gate 22. The continuous engagement of the valve pin 36 with the mold gate 22 functions to align the valve pin 36 within the mold gate 22. This is particularly useful in cases where the injection pressure is high and the transfer nozzle elements are very long. Further, wear of the mold gate 22 and the valve pin 36 is reduced.

Operation of the injection molding apparatus will now be described with reference to FIGS. 1 and 2. As shown in FIG. 1, the injection molding apparatus 10 begins the injection cycle with the valve pin 36 in the retracted position. In this position, melt flow from the nozzle channel 18 into the mold cavity 20 is blocked. The piston 39 is then actuated within cylinder 40 to move the valve pin 36 to the extended position of FIG. 2. Melt is delivered from the machine nozzle and flows through the manifold channel 14 and the nozzle channel 18. From the nozzle channel 18, the melt flows into the mold cavity 20 by passing through a material feeding portion defined by the grooves 46, 48 that are provided on opposite sides of the valve pin 36. As the valve pin 36 moves into the extended position, a portion of the outer surface 50 of the valve pin 36 continuously abuts the mold gate 22 to align the valve pin 36.

Once the mold cavity 20 has been filled with melt, the flow from the machine nozzle is halted and piston 39 is actuated within cylinder 40 to return the valve pin 36 to the retracted position. The melt in the mold cavity 20 is held at a sufficient pressure to allow the melt to decompress to fill the void that is left when the valve pin 36 is moved out of the mold cavity 20. The mold cavity 20 is then cooled and the molded parts are ejected from the mold cavity 20.

Operation of the valve pin is controlled by at least one sensor (not shown). The sensor may be located in the mold cavity 20, the nozzle 16, or the manifold 12.

Figure 6:
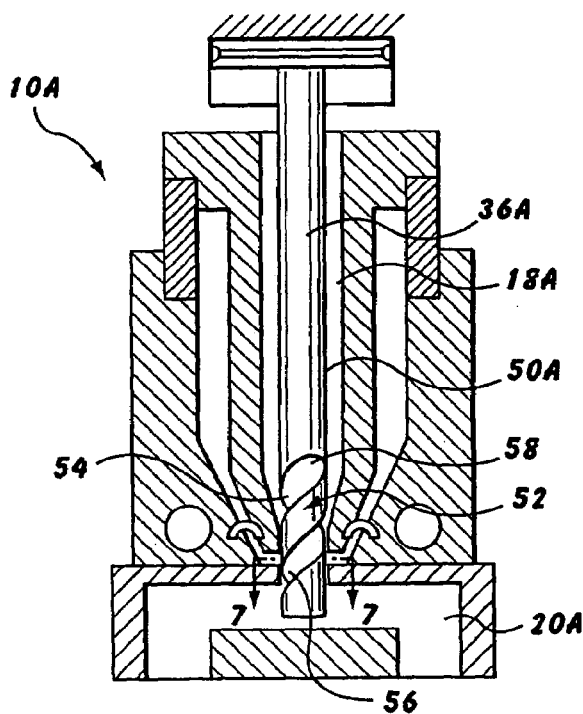
FIG. 6 is a side view partly in section of an injection molding apparatus according to another embodiment of the present invention.
Figure 7:
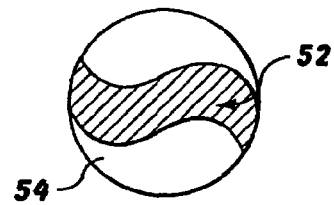
FIG. 7 is a view on 7—7 of FIG. 6.

Referring to FIGS. 6 and 7, another embodiment of an injection molding apparatus 10a is shown. In this embodiment, the grooves 46 and 48 of valve pin 36 of FIGS. 1 to 5 have been replaced with a single spiral or a helical groove 52 for guiding the melt from the nozzle into the mold cavity 20a during injection. The helical groove 52 is formed in an outer surface 50a of valve pin 36a. The helical groove 52 includes an inlet 58 and an outlet 56 and forms part of nozzle channel 18a when the valve pin 36a is in the extended position, as shown. The helical groove 52 is shaped to force the melt to follow a generally helical path between the nozzle channel 18a and mold cavity 20a. More than one helical groove may be provided to form more than one melt stream.

In another embodiment, the helical groove is a melt homogenizing element. In this embodiment, the melt homogenizing element causes the melt stream to rotate and thus, overlap and be redistributed as it moves through the helical groove so that the temperature and viscosity of the melt entering the mold cavity will be generally uniform. Thus, producing a high quality molded part that is generally free of flow lines.

Figure 8:
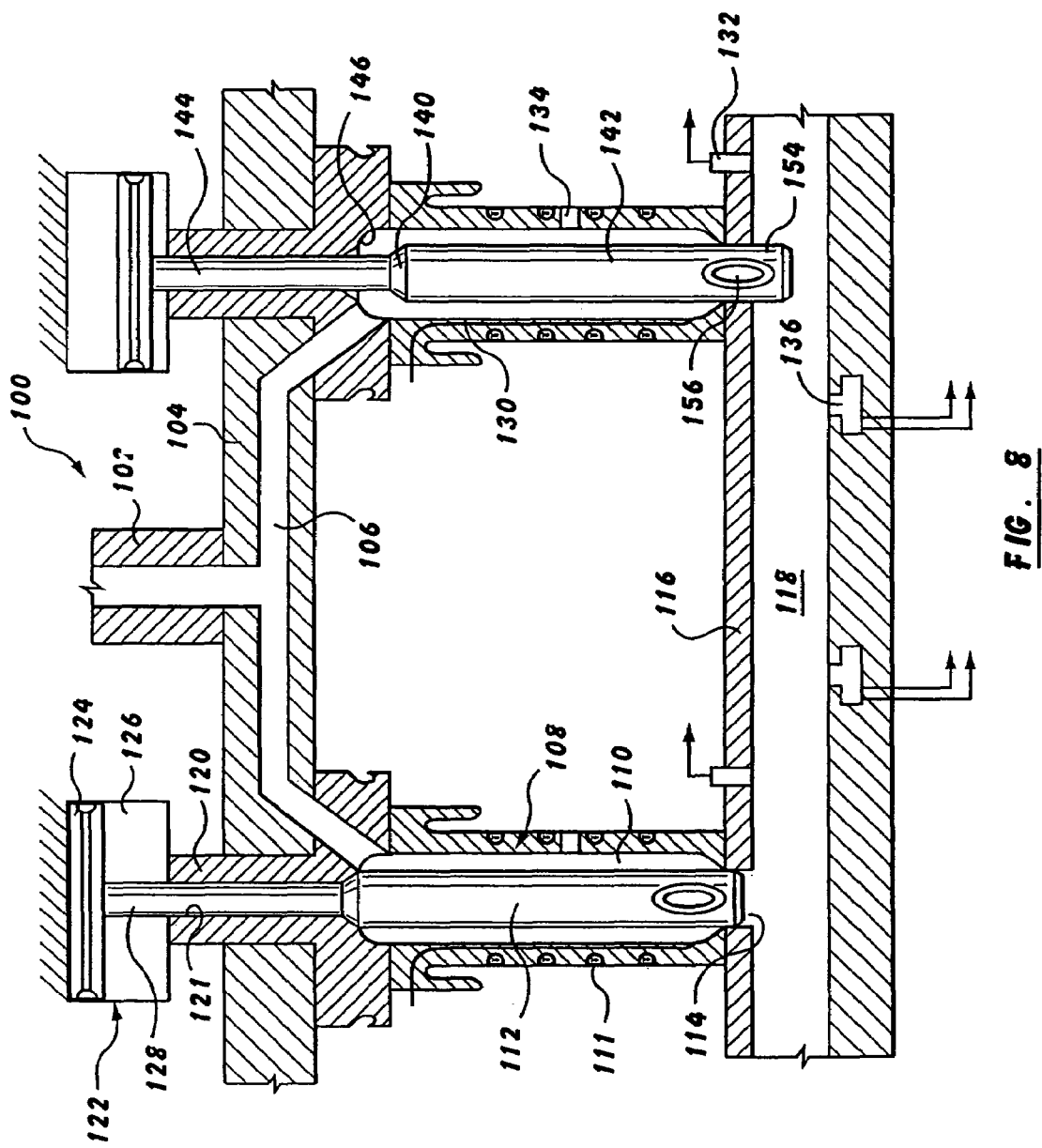
FIG. 8 is a side sectional view of an injection molding apparatus according to another embodiment of the present invention.

Referring to FIG. 8, another embodiment of an injection molding apparatus 100 is shown. The injection molding apparatus 100 is used in sequential molding in which more than one nozzle is used to inject melt into a single mold cavity. In this type of molding, the flow of melt from the nozzles is controlled in order to specify the location at which the different melt streams meet in the mold cavity.

The injection molding apparatus 100 includes a manifold 104 having a manifold channel 106 for receiving, a melt stream of moldable material from a machine nozzle (not shown) through a sprue bushing 102. Nozzles 108 having nozzle channels 110 are coupled to the manifold 104. The nozzle channels 110 receive melt from the manifold channel 106. Valve pins 112 extend through the nozzles 108 and communicate with mold gates 114, which are provided in mold cavity plate 116. The valve pins 112 control the flow of melt from the nozzle channels 110 into a mold cavity 118. Heaters 111 heat the nozzles 108 and heaters (not shown) heat the manifold 104.

The valve pin 112 extends through a valve pin bushing 120 that is located between the nozzle and an actuating mechanism 122. The actuating mechanism 122 is generally a piston 124 that is slidable within a cylinder 126. A rear end 128 of the valve pin 112 is coupled to the piston 124 and the valve pin 112 is reciprocatable through the nozzle channel 110 to open and close the mold gate 114. The actuating mechanism 122 is pneumatically controlled. Alternatively, the actuating mechanism 122 may be controlled hydraulically or by other suitable means.

Similar to the previous embodiments, the valve pin 112 is seated in the mold gate 114 when it is in a retracted position, as shown by the nozzle on the left of FIG. 8, and allows melt to flow into the mold cavity 118 when it is in an extended position, as shown by the nozzle on the right of FIG. 8.

Figure 9:
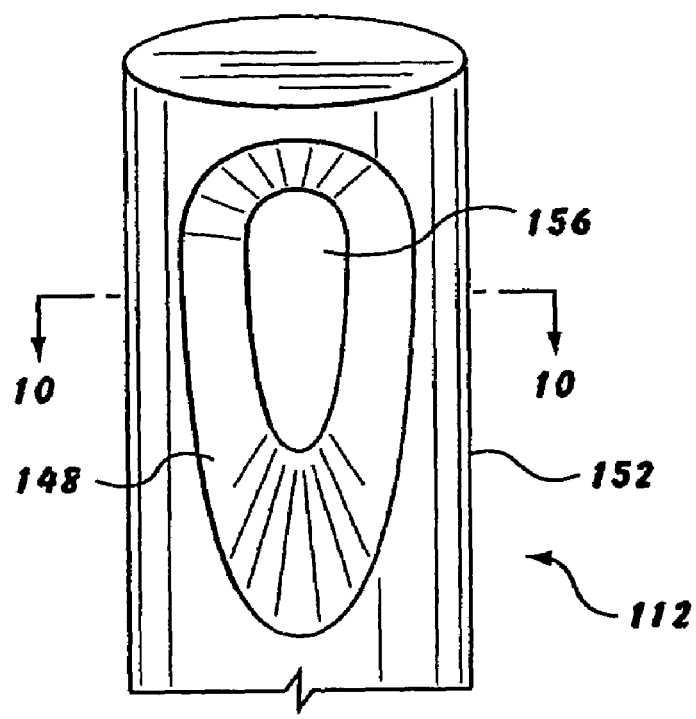
FIG. 9 is a view of a portion of a valve pin of FIG. 8.
Figure 10:
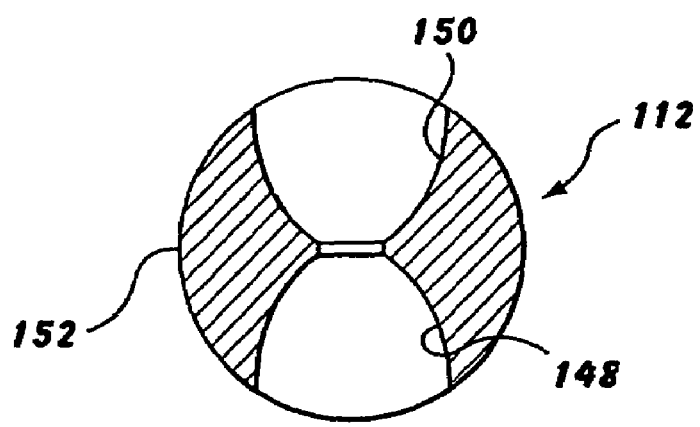
FIG. 10 is a view on 10—10 of FIG. 9.

Referring to FIGS. 9 and 10, the valve pin 112 includes a pair of opposing grooves, or notches, 148 and 150 that are formed in an outer surface 152 thereof. The grooves 148, 150 extend along a portion of a forward end 154 of the valve pin 112 on opposite sides thereof. The grooves 148, 150 intersect one another to provide an aperture 156 that extends through the valve pin 112. When the valve pin 112 is in the extended position, the forward end 154 of the valve pin 112 is partially located in the mold cavity 118 and the aperture 156 is aligned with the mold gate 114 to allow melt to flow from the nozzle channel 110 into the mold cavity 118. Each of the grooves 148, 150 has a generally smooth profile that is shaped to optimize the melt flow through the aperture 156.

At least a portion of the outer surface 152 of the valve pin 112 is continuously engaged in the mold gate 114 to align the valve pin 112 therewith. Thus reducing wear of both the mold gate 114 and the valve pin 112.

The valve pin 112 further includes a tapered portion, or shoulder, 140 that provides a transition between a larger diameter portion 142 and a smaller diameter portion 144. A seat 146, which is shaped to receive the tapered portion 140 of the valve pin 112, is provided in the valve pin bushing 120. In the retracted position, the tapered portion 140 of the valve pin 112 mates with seat 146 to provide a seal between the nozzle channel 110 and the valve pin bushing 140. The tapered portion 140 generally prevents melt from escaping into valve pin receiving bore 121, which reduces the likelihood of damage to the valve pin 112 or seizure of the valve pin 112 within the valve pin bushing 120. A similar arrangement for sealing off the nozzle channel is disclosed in U.S. Pat. No. 4,026,518 to Gellert, the contents of which are herein incorporated by reference.

The injection molding apparatus 100 further includes a thermocouple 130 for detecting the temperature of the melt in the nozzle 108 and a thermocouple 132 for detecting the temperature of the melt in the mold cavity 118.

In addition, a pressure sensors 134 and 136 are provided in the nozzle 108 and mold cavity 118, respectively. The pressure sensors 134, 136 detect the pressure of the melt in the nozzle 108 and in the mold cavity 118.

In operation, melt flows from the machine nozzle, through the sprue bushing 102, through the manifold channel 106 and into the nozzle channels 110 of the nozzles 108. The melt flow from each nozzle 108 is controlled using the valve pins 112 in order to specify the location at which the melt streams meet in the mold cavity 118. Once the mold cavity 118 has been filled with melt, the flow from the machine nozzle is halted and the valve pins 112 of the open nozzles 108 are returned to the retracted position. The melt in the mold cavity 118 is held at a sufficient pressure to allow the melt to decompress to fill the void that is left when the valve pins 112 of the open nozzles move out of the mold cavity 118. The mold cavity 118 is then cooled and the molded parts are ejected therefrom.

During the injection process, the valve pin 112 of one nozzle 108 may be held in the retracted position, while the valve pin 112 of another nozzle 108 is held in the extended position. This arrangement typically results in the melt in the closed nozzle 108 being at a very high pressure. Leaking of plastic from the nozzle channel 110 into the valve pin-receiving bore 121 of the valve pin bushing 120 as a result of the high pressure is substantially prevented by the tapered portion 140 of the valve pin 112, which mates with the seat 146 of the valve pin bushing 120 to provide a seal therebetween.

Figure 11:
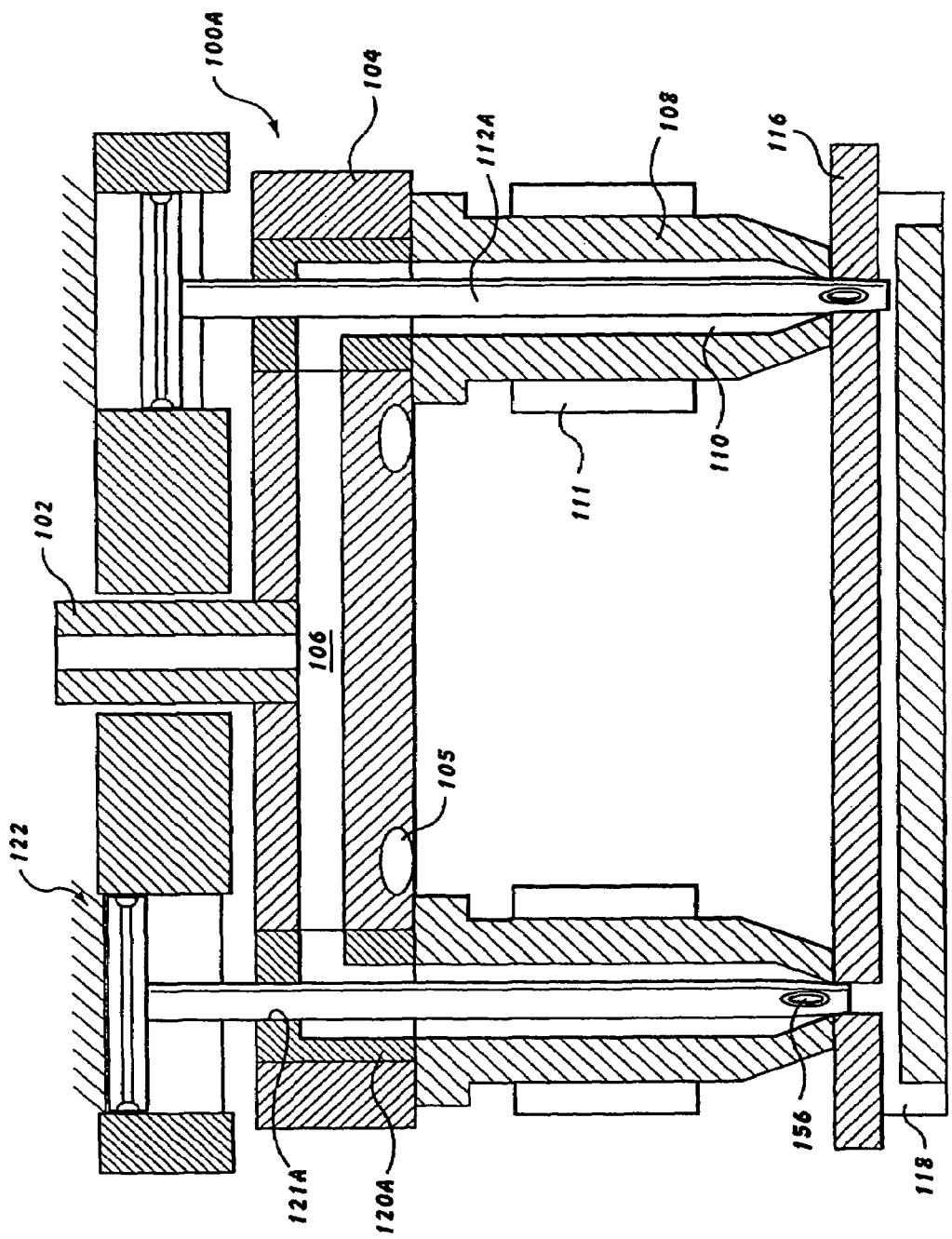
FIG. 11 is a side sectional view of an injection molding apparatus according to yet another embodiment of the present invention.

FIG. 11 shows another embodiment of an injection molding apparatus 100a. The injection molding apparatus 100a is similar to the injection molding apparatus 100 of FIG. 8, however, the tapered portion 140 has been removed so that the diameter of the valve pin 112a is constant. A manifold plug 120a is provided in the manifold 104 and includes a valve pin receiving bore 121a. Further, manifold heaters 105 are provided to heat the manifold 104.

Figure 12:
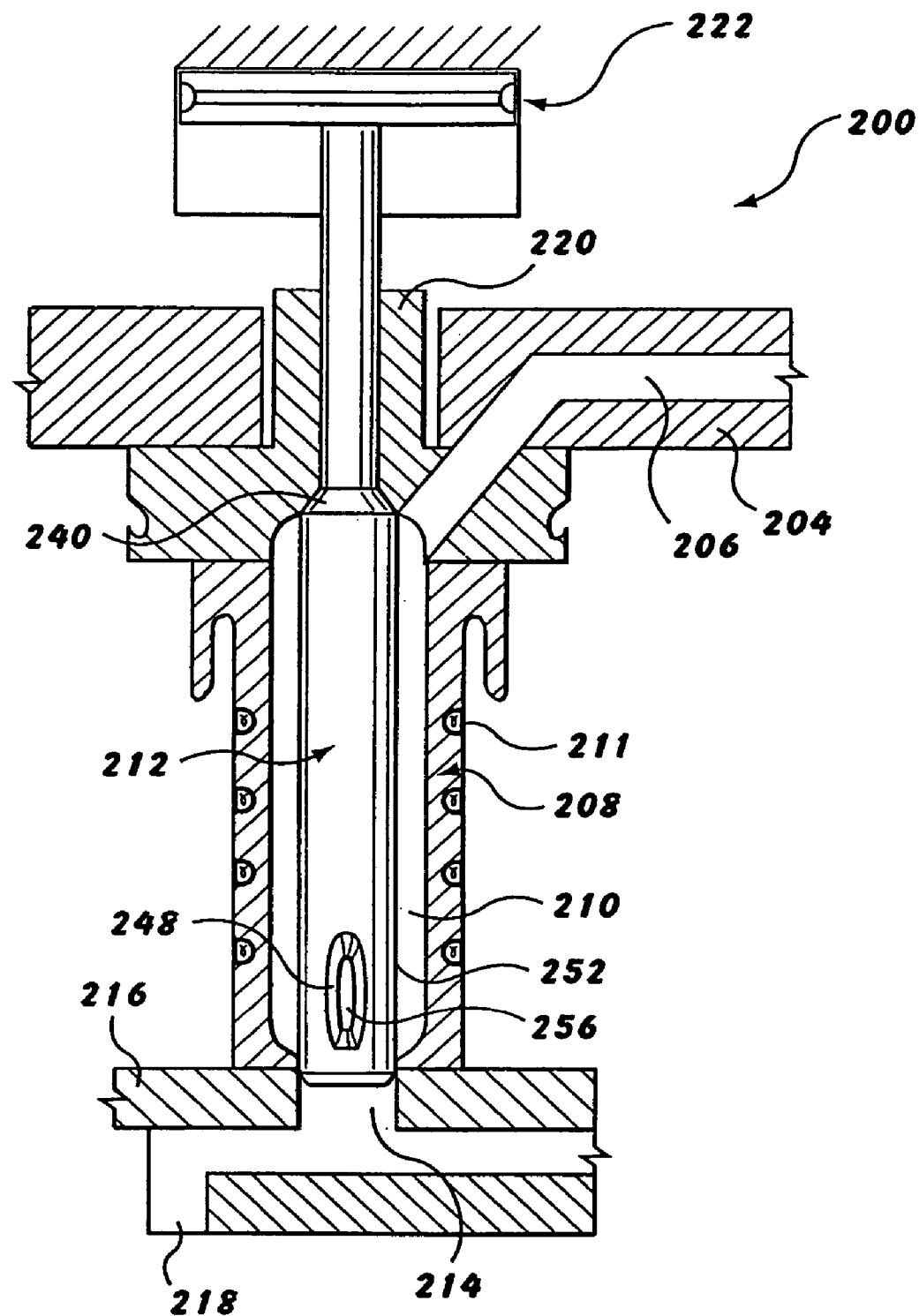
FIG. 12 is a side sectional view of an injection molding apparatus according to still another embodiment of the present invention.

Referring to FIG. 12, another embodiment of an injection molding apparatus 200, which is used in gas assist molding, is shown. Gas assist molding is used to form parts having inner hollow sections.

The injection molding apparatus 200 includes a manifold 204 having a manifold channel 206 for receiving melt from a machine nozzle (not shown) through a sprue bushing (not shown). A nozzle 208 having a nozzle channel 210 is coupled to the manifold 204. The nozzle channel 210 receives melt from the manifold channel 206. A valve pin 212 extends through the nozzle 208 and communicates with a mold gate 214 which is provided in mold cavity plate 216. The valve pin 212 is axially movable in the nozzle channel 210 by an actuating mechanism 222. The valve pin 212 controls the flow of melt from the nozzle channel 210 into a mold cavity 218. A heater 211 is provided to heat the nozzle 208 and a heater (not shown) heats the manifold 204.

The valve pin 212, which is slidable through a valve pin bushing 220, is similar to the valve pin 112 of the previously described embodiment of FIG. 8. The valve pin 212 moves from a retracted position in which the valve pin 212 is seated in the mold gate 214 to an extended position in which a portion of a forward end of the valve pin is located in the mold cavity 218. Grooves 248, 250 are provided in an outer surface 252 of the valve pin 212. (Groove 250 is located on the opposite of the valve pin 212 and is not visible in FIG. 12). The grooves 248, 250 intersect to provide an aperture 256 through the valve pin 212. In the extended position, the aperture 256 is aligned with the mold gate 214 to allow melt to flow from the nozzle channel 210 into the mold cavity 218.

In operation, melt flows from the machine nozzle, through the sprue bushing and manifold channel 206 into the nozzle channel 110. The valve pin 212 is moved from the retracted position to the extended position by the actuator 222. A predetermined quantity of melt, which is less than the volume of the mold cavity 218, is injected from the nozzle channel 210 into the mold cavity 218. Following injection of the melt, the valve pin 218 is returned to the retracted position to block the mold gate 214 and a gas is injected into the cavity 218. The gas creates a high pressure in the mold cavity 218 and forces the melt through the mold cavity 218 and against mold cavity walls while the melt cools. The high pressure in the mold cavity 218 further exerts a force on the valve pin 212.

In traditional valve pins, the high pressure in the mold cavity may cause the valve pin to retract into the nozzle channel and open the mold gate, which is undesirable. In the injection molding apparatus 200, the valve pin 212 is restricted from retracting into the nozzle channel 210 by the actuator 222.

Because the valve pin 212 must extend in order to open the valve gate 214, the valve gate 214 will not open as a result of the pressure in the mold cavity 218. Tapered portion 240 acts as a further stop for the valve pin 212.

Figure 13:
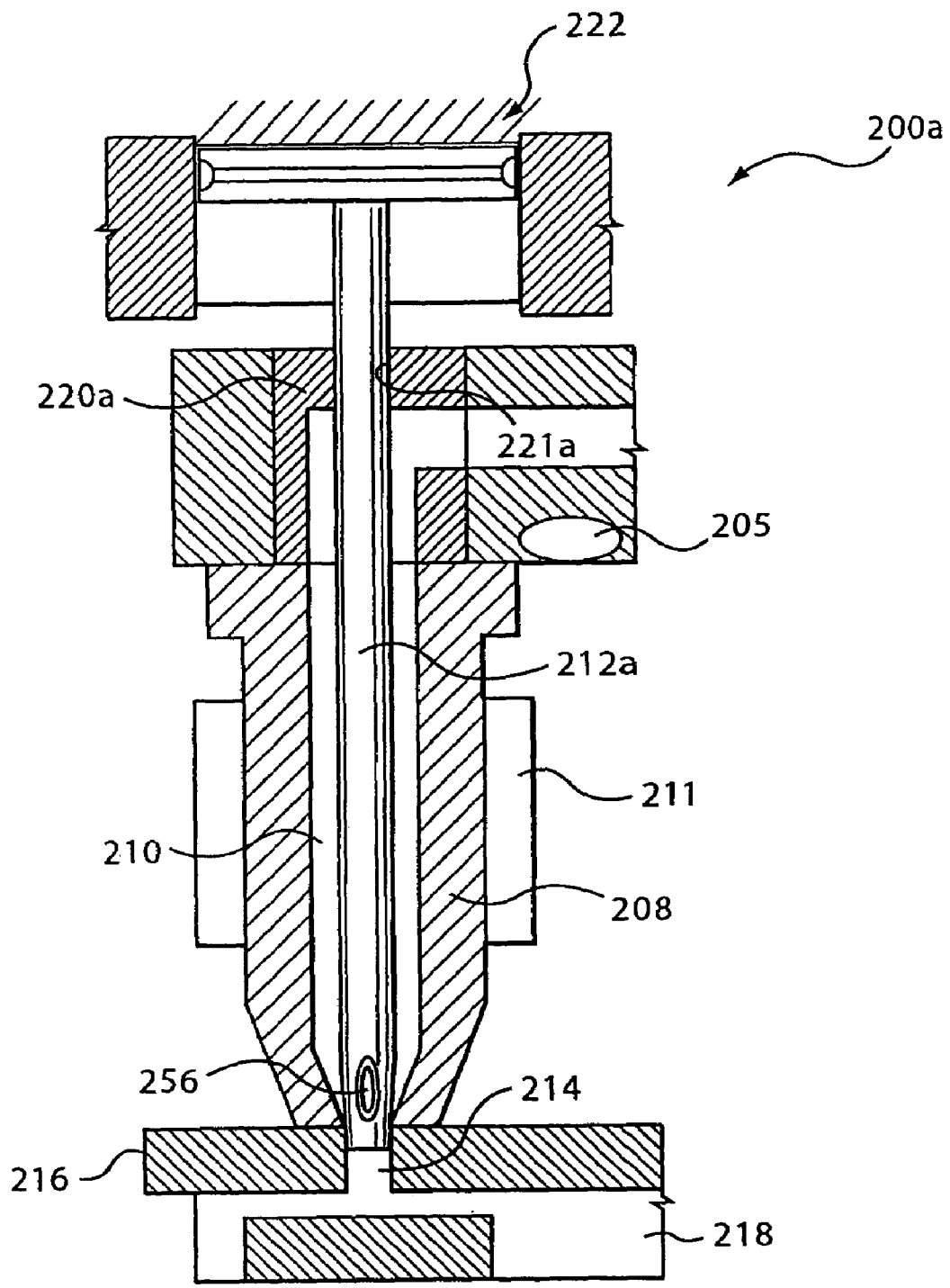
FIG. 13 is a side sectional view of an injection molding apparatus according to another embodiment of the present invention.

FIG. 13 shows another embodiment of an injection molding apparatus 200a. The injection molding apparatus 200a is similar to the injection molding apparatus 200 of FIG. 12, however, the tapered portion 240 has been removed so that the diameter of valve pin 212a is constant. A manifold plug 220a is provided in manifold 204 and includes a valve pin receiving bore 221a. Further, manifold heaters 205 are provided to heat the manifold 104.

Figure 14:
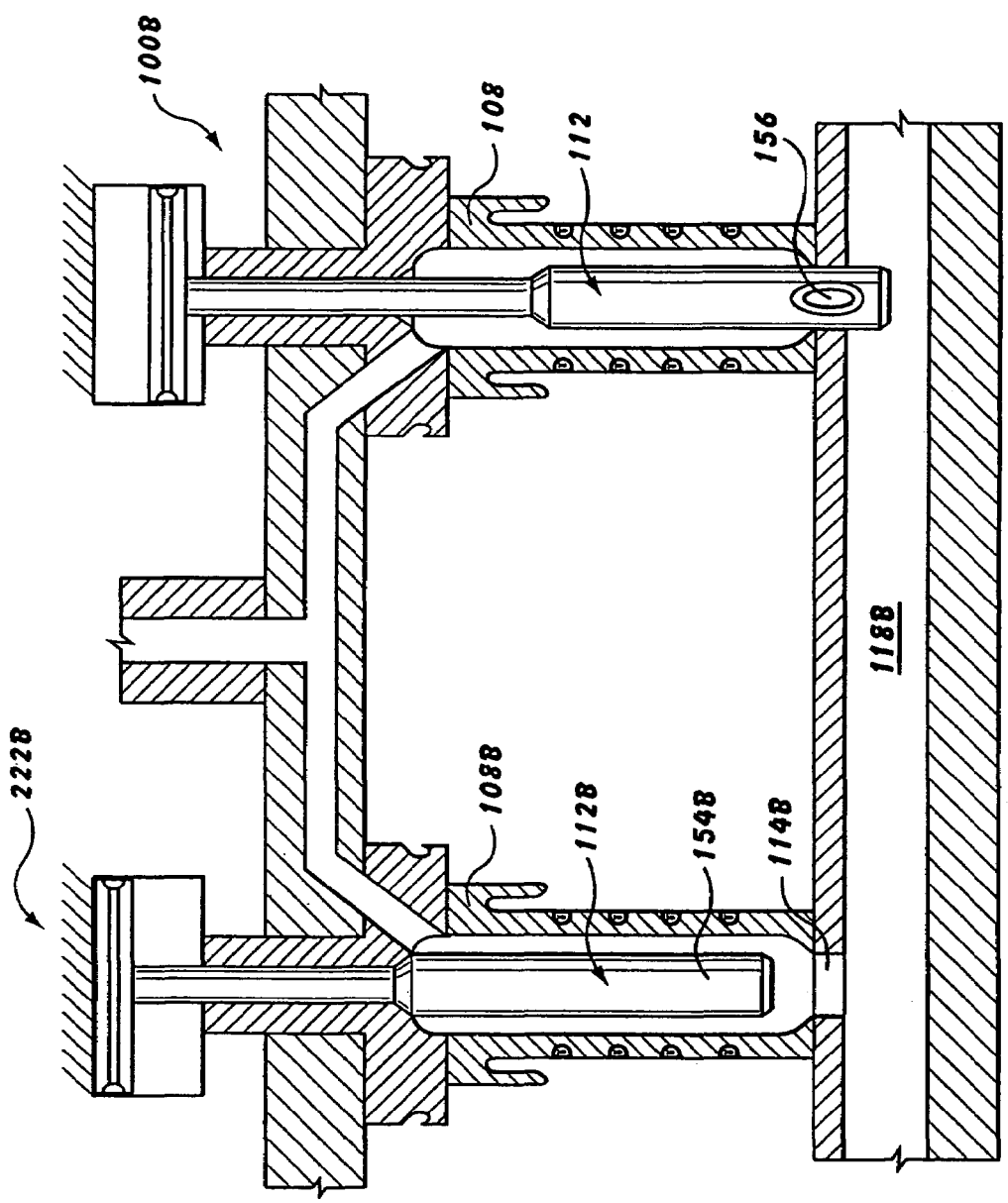
FIG. 14 is a side sectional view of an injection molding apparatus according to another embodiment of the present invention with the valve pins in an open position.
Figure 15:
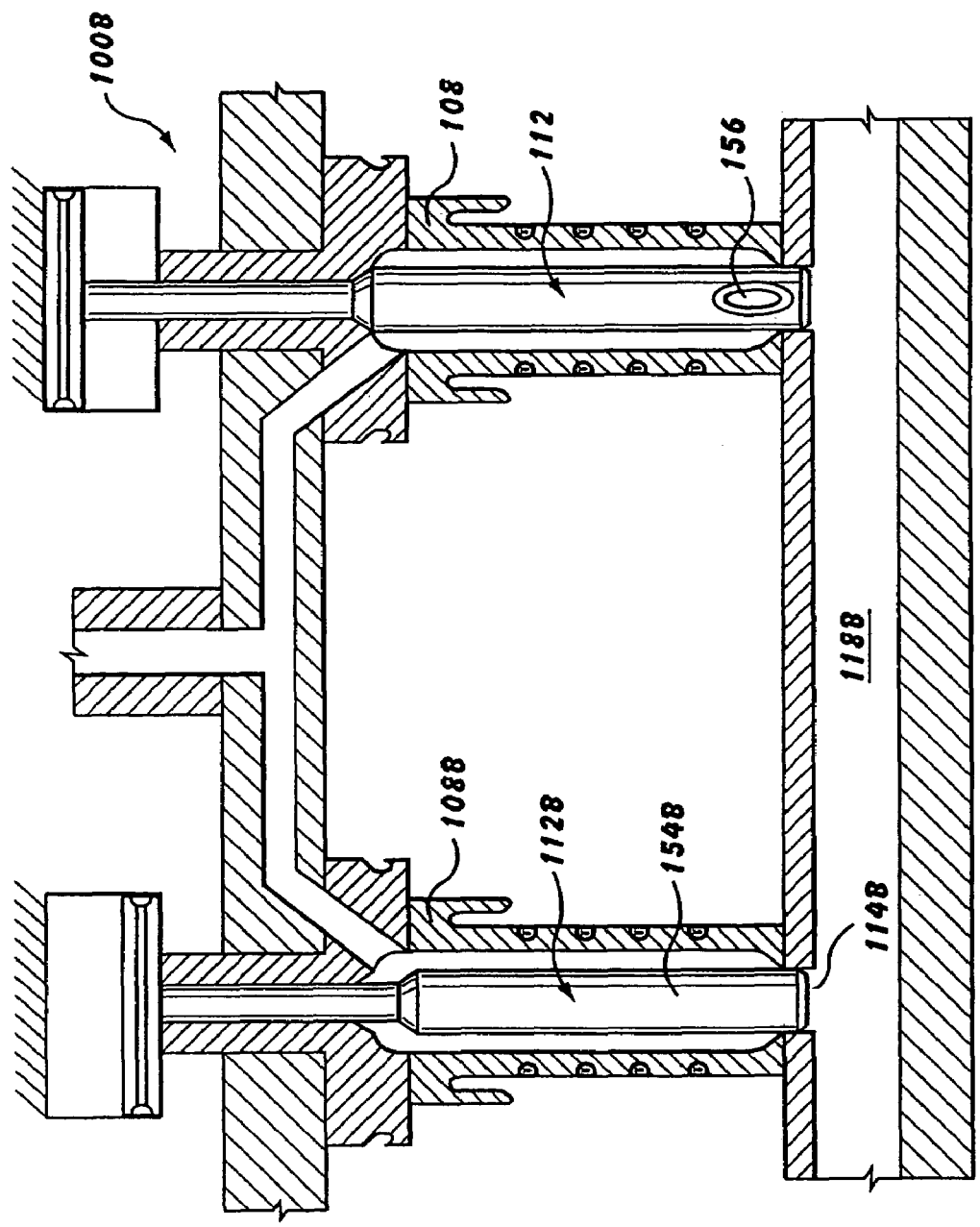
FIG. 15 is a side sectional view of the injection molding apparatus of FIG. 14 with the valve pins in a closed position.

Referring to FIGS. 14 and 15, another embodiment of an injection molding apparatus 100b is shown. The injection molding apparatus 100b is used in sequential molding and includes a nozzle 108b having a valve pin 112b, which is located on the left of the Figure, and a nozzle 108 having a valve pin 112, which is located on the right of FIG. 14 and is generally identical to the nozzle 108 of FIG. 8.

Valve pin 112b operates in an opposite manner to valve pin 112. The valve pin 112b is movable by an actuating mechanism 222b from a retracted position, in which mold gate 114b is open, and an extended position, in which the mold gate 114b is closed. Unlike the valve pin 112, a forward end 154b of the valve pin 112b does not extend into the mold cavity 118b during the injection process. Therefore, the aperture 156 is not included in the valve pin 112b because the valve pin 112b is not in continuous engagement with the mold gate 114b. FIG. 14 shows both valve pins 112b and 112 in an open position and FIG. 15 shows both valve pins 112b and 112 in the closed position.

By including different types of valve gating mechanisms, 112b and 112, in the injection molding apparatus 100b, the operator is able to pack the melt in the mold cavity 118b using the valve pin 112b, while the valve pin 112 will require no additional pressure to remain in a retracted, closed, position.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An injection molding apparatus comprising;
a manifold having a manifold channel for receiving a melt stream of moldable material under pressure and delivering said melt stream to a nozzle channel of a nozzle;
a mold cavity in communication with said nozzle channel of said nozzle for receiving melt through a mold gate;
a valve pin axially movable through said nozzle channel of said nozzle to selectively open said mold gate, said mold gate being open when said valve pin is in an extended position in which a portion of said valve pin is received in said mold cavity; and
an aperture provided through said valve pin, at least a portion of an outer surface of said valve pin being in continuous engagement with said mold gate to align said valve pin relative to said mold gate;
wherein in said extended position said aperture is aligned with said mold gate to allow melt to flow between said nozzle channel and said mold cavity and in a retracted position said valve pin is seated in said mold gate to block melt flow between said nozzle channel and said mold cavity.

2. An injection molding apparatus as claimed in claim 1, wherein said aperture has a smooth profile to facilitate the flow of melt from said nozzle channel to said mold cavity.

3. An injection molding apparatus as claimed in claim 1, wherein said aperture is formed from intersecting first and second grooves provided in said outer surface of said valve pin.

4. An injection molding apparatus as claimed in claim 1, wherein movement of said valve pin from said extended position to said retracted position causes said melt in said mold cavity to be decompressed to fill said mold cavity.

5. An injection molding apparatus as claimed in claim 2, further comprising a valve pin bushing, said valve pin bushing being received in a bore provided in said manifold, said valve pin being slidable through said valve pin bushing.

6. An injection molding apparatus as claimed in claim 5, wherein said valve pin includes a tapered portion that provides a transition between a larger diameter portion and a smaller diameter portion, said tapered portion for mating with a seat provided in said valve pin bushing.

7. An injection molding apparatus comprising:
a manifold having a manifold channel for receiving a melt stream of moldable material under pressure and delivering said melt stream to a nozzle channel of a nozzle;
a mold cavity in communication with said nozzle channel of said nozzle for receiving melt through a mold gate;
a valve pin axially movable through said nozzle channel of said nozzle between a retracted position, in which a forward end of said valve pin is seated in said mold gate to block melt flow between said nozzle channel and said mold cavity, and an extended position, in which a portion of said valve pin is received in said mold cavity; and
a spiral groove provided in a guiding surface of said valve pin, at least a portion of said guiding surface being in continuous engagement with said mold gate to align said valve pin relative to said mold gate;
wherein in said extended position, said spiral groove is aligned with said mold gate to allow melt to flow between said nozzle channel and said mold cavity.

8. An injection molding apparatus as claimed in claim 7, wherein movement of said valve pin from said extended position to said retracted position causes said melt in said mold cavity to be decompressed to fill said mold cavity.

9. An injection molding apparatus as claimed in claim 7, further comprising a valve pin bushing, said valve pin bushing being received in a bore provided in said manifold, said valve pin being slidable through said valve pin bushing.

10. An injection molding apparatus as claimed in claim 9, wherein said valve pin includes a tapered portion that provides a transition between a larger diameter portion and a smaller diameter portion, said tapered portion for mating with a seat provided in said valve pin bushing.

11. An injection molding apparatus comprising:
a manifold having a manifold channel for receiving a melt steam of moldable material under pressure;
a first nozzle having a first nozzle channel for receiving said melt stream from said manifold channel, said first nozzle channel having a first valve pin axially movable therethrough, said first valve pin for selectively opening a first mold gate,
a second nozzle having a second nozzle channel for receiving said melt stream from said manifold channel, said second nozzle channel having a second valve pin axially movable therethrough, said second valve pin for selectively opening a second mold gate;
a mold cavity in communication with said first nozzle channel and said second nozzle channel for receiving melt through said first mold gate and said second mold gate; and
an aperture provided through said first valve pin, at least a portion of an outer surface of said first valve pin being in continuous engagement with said first mold gate to align said valve pin relative to said first mold gate;
wherein said first mold gate is open when said first valve pin is in an extended position in which a portion of said first valve pin is received in said mold cavity and said aperture is aligned with said first mold gate.

12. An injection molding apparatus as claimed in claim 11, wherein at least one groove is provided in an outer surface of said second valve pin, at least a portion of said outer surface of said second valve pin being in continuous engagement with said second mold gate to align said second valve pin relative to said second mold gate, said second mold gate being open when said second valve pin is in an extended position in which a portion of said second valve pin is received in said second mold cavity and said at least one groove is aligned with said second mold gate.

13. An injection molding apparatus as claimed in claim 11, wherein said second valve pin is movable between an extended position in which said second valve pin is seated in said second mold gate and a retracted position in which said second mold gate is open.

14. An injection molding apparatus as claimed in claim 11, wherein said first valve pin includes a shoulder, said shoulder for blocking retraction of said first valve pin from a position in which said first valve pin is seated in said first mold gate.

15. An injection molding apparatus as claimed in claim 12, wherein said first valve pin includes a shoulder, said shoulder for blocking retraction of said first valve pin from a position in which said first valve pin is seated in said first mold gate.

16. An injection molding apparatus as claimed in claim 15, wherein said second valve pin includes a shoulder, said shoulder for blocking retraction of said second valve pin from a position in which said second valve pin is seated in said second mold gate.

17. An injection molding apparatus as claimed in claim 11, wherein the movement of said first valve pin is controlled by at least one sensor, said at least one sensor being located in any one of the mold cavity, the first nozzle and the manifold.

18. An injection molding apparatus as claimed in claim 17, wherein the movement of said second valve pin is controlled by at least one sensor, said at least one sensor being located in any one of the mold cavity, the second nozzle and the manifold.

19. An injection molding apparatus as claimed in claim 11, wherein said aperture is formed from intersecting first and second grooves provided in said outer surface of said valve pin.

20. An injection molding apparatus comprising;
a manifold having a manifold channel for receiving a melt stream of moldable material under pressure and delivering said melt stream to a nozzle channel of a nozzle;
a mold cavity in communication with said nozzle channel of said nozzle for receiving melt through a mold gate;
a valve pin axially movable through said nozzle channel of said nozzle to selectively open said mold gate, said mold gate being open when said valve pin is in an extended position in which a portion of said valve pin is received in said mold cavity;

a first groove provided in an outer surface of said valve pin, at least a portion of said outer surface of said valve pin being in continuous engagement with said mold gate to align said valve pin relative to said mold gate, wherein in said extended position said first groove is aligned with said mold gate to allow melt to flow between said nozzle channel and said mold cavity and in a retracted position said valve pin is seated in said mold gate to block melt flow between said nozzle channel and said mold cavity; and a valve pin bushing, said valve pin bushing being received in a bore provided in said manifold, said valve pin being slidable through said valve pin bushing, wherein said valve pin includes a tapered portion that provides a transition between a larger diameter portion and a smaller diameter portion, said tapered portion for mating with a seat provided in said valve pin bushing.

21. An injection molding apparatus as claimed in claim 20, wherein said groove has a smooth profile to facilitate the flow of melt from said nozzle channel to said mold cavity.

22. An injection molding apparatus as claimed in claim 21, further comprising a second groove provided in said outer surface of said valve pin, said second groove being located opposite said first groove.

23. An injection molding apparatus as claimed in claim 20, wherein movement of said valve pin from said extended position to said retracted position causes said melt in said mold cavity to be decompressed to fill said mold cavity.

24. An injection molding apparatus as claimed in claim 22, wherein said first groove and said second groove intersect to provide an aperture through said valve pin.

* * * * *